(12) United States Patent
Yoon et al.

(10) Patent No.: US 8,771,639 B2
(45) Date of Patent: Jul. 8, 2014

(54) METHODS FOR PREPARING COMPOSITES OF SUBSTRATE-MOLECULAR SIEVE

(75) Inventors: Kyung Byung Yoon, Seoul (KR); Jin Seok Lee, Seoul (KR); Jae Hyun Kim, Seoul (KR); Young Ju Lee, Yongin-si (KR); Nak Cheon Jeong, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 537 days.

(21) Appl. No.: 12/311,486

(22) PCT Filed: Jan. 4, 2008

(86) PCT No.: PCT/KR2008/000053
§ 371 (c)(1),
(2), (4) Date: Apr. 7, 2009

(87) PCT Pub. No.: WO2008/082269
PCT Pub. Date: Jul. 10, 2008

(65) Prior Publication Data
US 2009/0246122 A1 Oct. 1, 2009

(30) Foreign Application Priority Data
Jan. 5, 2007 (KR) .................. 10-2007-0001317

(51) Int. Cl.
*C01B 33/36* (2006.01)
*C01B 39/00* (2006.01)
*C01F 7/00* (2006.01)
(52) U.S. Cl.
USPC ............... 423/717; 423/700; 502/60; 502/63; 502/64
(58) Field of Classification Search
USPC ................. 423/700, 711, 717; 502/60, 63, 64
See application file for complete search history.

(56) References Cited

U.S. PATENT DOCUMENTS

2006/0199724 A1* 9/2006 Lee et al. ............... 502/60

OTHER PUBLICATIONS

Gu et al., Synthesis of Defect-Free FAU-ype Zeolite Membranes and Separation for Dry and Moist CO2/N2 Mixtures, 2005, Ind. Eng. Chem. Res., 44, 937-944.*
Ha et al., Micropatterning of Oriented Zeolite monolayers on Glass by Covalent Linkage, 2000, Adv. Matter. 12, 1614-1617.*
Yang, et al., Hierarchically Ordered Oxides, Science, vol. 282, Dec. 18, 1998, pp. 2244-2246, downloaded from www.sciencemag.org on May 17, 2009.

(Continued)

*Primary Examiner* — Kaj K Olsen
*Assistant Examiner* — Pritesh Darji
(74) *Attorney, Agent, or Firm* — Christie, Parker & Hale, LLP

(57) ABSTRACT

The present invention relates to a method for preparing composites of substrate-molecular sieve, in particular, to a method for preparing a composite of substrate-molecular sieve, which comprises applying a physical pressure to molecular sieve crystals against a substrate to form a chemical bond between the molecular sieve crystal and the substrate. The present invention requiring no solvents, reactors and other equipments enables molecular sieve crystals to be stably attached to the surface of substrates through various chemical bonds, particularly ionic present invention ensures the synthesis of substrate-molecular sieve composites with enhanced attachment rate, degree of lateral close packing (DCP) and attachment strength in more time-saving and energy-saving manners. The present method works well for molecular sieve crystals with lager sizes (e.g., more than 3 μm) with no generation of parasitic crystals. Furthermore, the present invention shows excellent applicability to large substrates, enabling the mass production of substrate-molecular sieve composites.

12 Claims, 6 Drawing Sheets
(5 of 6 Drawing Sheet(s) Filed in Color)

(56) References Cited

OTHER PUBLICATIONS

Huang, et al., Fabrication of Ordered Porous Structures by Self-Assembly of Zeolite Nanocrystals, Journal of the American Chemical Society, Mar. 22, 2000, pp. 3530-3531.
Li, et al., Micropatterned Oriented Zeolite Monolayer Films by Direct in Situ Crystallization, Chemistry of Materials, Jun. 18, 2003, pp. 2687-2689.
Park, et al., Micropatterned Monolayer Assembly of Zeolite Microcrystals on Glass by Ionic Linkages, ScienceDirect Microporous and Mesoporous Materials, 96, 2006, pp. 1-8.
Ha, et al., Photochemical Pattern Transfer and Patterning of Continuous Zeolite Films on Glass by Direct Dipping in Synthesis Gel, Advanced Materials, 2001, vol. 13, No. 8, pp. 594-596.
Ha, et al., Micropatterning of Oriented Zeolite Monolayers on Glass by Covalent Linkage, Advanced Materials, 2000, vol. 12, No. 21, pp. 1614-1617.
Geier, et al., Interference Microscopy Investigation of the Influence of Regular Intergrowth Effects in MFI-Type Zeolites on Molecular Uptake, The Journal of Physical Chemistry, 2001, pp. 10217-10222.
Weidenthaler, et al., Optical Investigations of Intergrowth Effects in the Zeolite Catalysts ZSM-5 and ZSM-8, 1994, vol. 98, No. 48, pp. 12687-12694.
Price, et al., Crystal Structure of Tetrapropylammonium fluoride-Containing Precursor to Fluoride Silicalite, Journal of the American Chemical Society, 1982, pp. 5971-5977.
Schuth, et al., Microporous and Mesoporous Materials, Advanced Materials, 2002, vol. 14, No. 9, pp. 629-638.
Kim, et al., Very High Third-Order Nonlinear Optical Activities of Intrazeolite PbS Quantum Dots, Journal of American Chemical Society, 2006, vol. 128, pp. 15070-15071.
Kim, et al., Aligned Inclusion of Hemicyanine Dyes into Silica Zeolite Films for Second Harmonic Generation, Journal of American Chemical Society, 2004, vol. 126, pp. 673-682.
Wang, et al., Pure-Silica Zeolite Low-$k$ Dielectric Thin Films, Advanced Materials, 2001, vol. 13, No. 10, pp. 746-749.
Wang, et al., Pure Silica Zeolite Films as Low-k Dielectrics by Spin-On of Nanoparticle Suspensions, Advanced Materials, 2001, vol., 13, No. 19, pp. 1463-1466.
Pradhan, et al., Zeolite-Coated Optical Microfibers for Intrazeolite Photocatalysis Studied by in Situ Solid-State NMR, Journal of the American Chemical Society, 2000, vol. 122(2), pp. 404-405.
Ban, et al., Preparations of a Completely Oriented Molecular Sieve Membrane, Agnew. Chem. Int. Ed., 1999, vol. 38, No. 22; pp. 3324-3326.
Li, et al., TEM Investigation of Formation Mechanism of Monocrystal-Thick $b$-Oriented Pure Silica Zeolite MFI Film, Journal of the American Chemical Society, 2004, vol. 126 (34), pp. 10732-10737.
Yan, et al., Molecular Recognition on Acoustic Wave Devices: Sorption in Chemically Anchored Zeolite Monolayers, The Journal of Physical Chemistry, 1992, vol. 96 (23), pp. 9387-9393.
Mintova, et al., Growth of Silicalite Films on Pre-Assembled Layers of Nanoscale Seed Crystals on Piezoelectric Chemical Sensors. Advanced Materials, 1997, vol. 9, No. 7, pp. 585-589.
Mabande, Preparation of b-Oriented MFI Films on Porous Stainless Steel Substrates, Industrial & Engineering Chemistry Research, 2005, vol. 44 (24), pp. 9086-9095.
Lai, et al., Microstructural Optimization of a Zeolite Membrane for Organic Vapor Separation, Science, Apr. 18, 2003, vol. 300, pp. 456-460, downloaded from www.sciencemag.org on May 17, 2009.
Lee, et al., Colloidal Crystal Layers of Hexagonal Nanoplates by Convective Assembly, Langmuir 2006, vol. 22, pp. 5217-5219.
Ruiz, et al., Organizing Supramolecular Functional Dye-Zeolite Crystals, InterScience, Angew. Chem. Int. Ed. 2006, vol. 45, pp. 5282-5287.
Calzaferri, et al., Light-Harvesting Host-Guest Antenna Materials for Quantum Solar Energy Conversion Devices, Elsevier, C.R. Chimie 9, 2006, pp. 214-225.
Li, et al., Silver-Zeolite-Modified Electrodes: An Intrazeolite Electron Transport Mechanism, The Journal of Physical Chemistry, 1995, vol. 99, pp. 2119-2126.
Lee, et al., Facile Monolayer Assembly of Fluorophore-Containing Zeolite Rods in Uniform Orientations for Anisotropic Photoluminescence, Agnew. Chem. Int. Ed., 2006, 45, pp. 5288-5292.
Ha, et al., Facile Assembly of Zeolite Monolayers on Glass, Silica, Alumina, and Other Zeolites Using 3-Halopropylsilyl Reagents as Covalent Linkers, Advanced Materials, 2000, vol. 12, No. 15, pp. 1114-1117.
Lee, et al., Ultrasound-Aided Remarkably Fast Assembly of Monolayers of Zeolite Crystals on Glass with a Very High Degree of Lateral Close Packing, Advanced Materials, 2005, vol. 17, No. 7, pp. 837-841.
Kulak, et al., Polyamines as Strong Molecular Linkers for Monolayer Assembly of Zeolite Crystals on Flat and Curved Glass, Journal of the American Chemical Society, 2000, vol. 122, pp. 9308-9309.
Park, et al., Organization of Microcrystals on Glass by Adenine-Thymine Hydrogen Bonding, Journal of the American Chemical Society, 2002, vol. 124, No. 45, pp. 13366-13367.
Lee, et al., Layer-by-Layer Assembly of Zeolite Crystals on Glass with Polyelectrolytes as Ionic Linkers, Journal of the American Chemical Society, 2001, vol. 123 (40), pp. 9769-9779.
Yoon, Organization of Zeolite Microcrystals for Production of Functional Materials, Accounts of Chemical Research, 2007, vol. 40(1), pp. 29-40.
Yoon, Mono and Multilayer Assembly of Zeolite Microcrystals on Substrates, Bulletin Korean Chemical Society, 2006, vol. 27, No. 1, pp. 17-26.
Haddour, et al., Electrogeneration of a Poly(pyrrole)-NTA Chelator Film for a Reversible Oriented Immobilization of Histidine-Tagged Proteins, Journal of the American Chemical Society, 2005, vol. 127 (16), pp. 5752-5753.
Keegan, et al., Circular Dichroism Spectroscopy of Folding in a Protein Monolayer, Angew. Chemical Int. Ed., 2005, vol. 44, pp. 4801-4804.
Liu, et al., RNA-Mediated Synthesis of Palladium Nanoparticles on Au Surfaces, Langmuir, 2006, vol. 22 (13), pp. 5862-5866.
Katz, et al., Magnetoswitchable Reactions of DNA Monolayers on Electrodes: Gating the Processes by Hydrophobic Magnetic Nanoparticles, Journal of the American Chemical Society, 2005, vol. 127 (25), pp. 9191-9200.
Shen, et al., Charging Behavior of Single-Stranded DNA Polyelectrolyte Brushes, Journal of the American Chemical Society, 2006, vol. 128 (26), pp. 8427-8433.
Riklin, et al., Glucose and Acetylcholine Sensing Multilayer Enzyme Electrodes of Controlled Enzyme Layer Thickness, 1995, vol. 67 (22), pp. 4118-4126.
Ulman, Formation and Structure of Self-Assembled Monolayers, Chemical Reviews, 1996, vol. 96 (4), pp. 1533-1554.

\* cited by examiner

METHODS FOR PREPARING COMPOSITES OF SUBSTRATE-MOLECULAR SIEVE

CROSS-REFERENCE TO RELATED APPLICATION

This application is a National Phase Patent Application of International Application Number PCT/KR2008/000053, filed on Jan. 4, 2008, which claims priority of Korean Patent Application Number 10-2007-0001317, filed on Jan. 5, 2007.

BACKGROUND OF THE INVENTION

1. Field of the Invention

The present invention relates to a method for preparing composites of substrate-molecular sieve.

2. Description of the Related Art

Zeolite is a generic name of crystalline aluminosilicate, which constitutes the pore skeleton of zeolite molecules and bears an anionic charge for each aluminum atom. Cations for offsetting such anion charges are present within the pore space and the remaining pore space is filled with water. Where zeolite is heated for a given period of time at 200-300° C., anions or water molecules are released, rendering it to accept other molecules into its pores. Such acceptance ability allows zeolite to have size selectivity or shape selectivity to certain molecules and thus zeolite is called as a molecular sieve.

Zeotype molecular sieves generated by replacing a portion or all of silicon (Si) and/or aluminum (Al) atoms of a zeolite molecule are also widely used in the industrial field. For example, zeotype molecular sieves in which anions are replaced with metal atoms serve as a catalyst for cracking petroleum. Besides, zeolites and zeotype molecular sieves have been reported to be useful as adsorbent, water-absorbing agent, gas-purifying agent, additives for detergent, ion exchanger, soil improving agent and carrier for sensor.

Zeolites and zeotype molecular sieves generally exist as fine powders. For practical application, it has been extensively studied that fine powders of zeolites or zeotype molecular sieves are attached to the surface of substrates such as glass, ceramic, polymer and metal.

As the simplest approach, it has been suggested that zeolite particles are attached to substrates via physical interaction by immersing substrates into the suspension containing zeolite crystals (L. C. Boudreau, J. A. Kuck, M. Tsapatsis, *J. Membr. Sci.*, 152:41-59 (1999)). Since this attempt is to control the dispersion of zeolite particles by adjusting the rate of taking zeolites out of the suspension, zeolite particles are unlikely to form an even monolayer and likely to be detached from substrates due to their merely physical adsorption to substrates.

In addition, the method using compounds carrying at their both ends methyldimethoxysilyl groups (Me(MeO)$_2$Si$^-$) as spacers for zeolite-substrate linkages has been suggested (Z. Li, C. Lai, T. E. Mallouk, *Inorg. Chem*, 28:178-182 (1989)). According to this report, one methyldimethoxysilyl group of the spacer is initially attached to substrates and the resultant is then mixed with zeolite particles to induce covalent linkages between the other methyldimethoxysilyl group and zeolite particles. Even though this method shows higher attachment strength than that of the simplest immersion-involving method, the orientation of zeolite particles cannot be controlled and two methyldimethoxysilyl groups of the spacer are found to be attached to substrates, which interferes the formation of linkages between substrates and zeolite particles.

It has been reported that linkages between substrates and zeolites can be formed via multi-ionic bonds (L. C. Boudreau, J. A. Kuck, M. Tsapatsis, *J. Membr. Sci.*, 152, 41-59 (1999)). Aminopropylgroups bound covalently on the surface of substrates are treated with hydrochloric acid to charge the surface with cations by ammonium ions and then treated with sodium polystyrene sulfate to convert charge of the surface to anions. Thin films of zeolites are prepared by repeating the two steps. However, such preparatory process requires at least six steps, and results in somewhat poor arrangement of zeolites and poor binding strength.

Moreover, it has been suggested that nuclei of zeolite particles are generated onto substrates and grown to directly synthesize zeolite films on the surface of substrates (J. C. Jansen, D. Kashchiev, A. Erdem-Senatalar, *Stud, Surf. Catal.*, 85:215-250 (1994)). However, such attempt has limitations and shortcomings in the senses that it necessitates unchangeable substrate under conditions for zeolite synthesis and is unable to control the thickness of zeolite monolayer.

In recent, zeolites and zeotype molecular sieves has been researched as innovative materials following accomplishment of the synthesis of nano-scaled zeolites (G. A. Ozin, A. Kuperman, A. Stein, *Angew. Chem. Int. Ed. Engl. Adv. Mater.* 28:359 (1989)). Particularly, zeolites have been studied to be applied as a host for a three-dimensional memory material (G. A. Ozin, A. Stein, G. D. Stucky, J. P. Godber, *J. Inclusion Phenom.* 6:379 (1990)), a light energy storage device (M. Bodja, P. K. Dutta, *Nature* 362:43 (1993)); M. Sykora, J. R. Kincaid, *Nature* 387:162 (1997)); Y. Kim et al., *J. Phys. Chem.* 101:2491 (1997)), a nanoelectrode (D. R. Rolison, C. A. Bessel, *Acc. Chem. Res.* 33:737 (2000)), a quantum beam or point of semiconductor (N. Herron et al., *J. Am. Chem. Soc.* 111:530 (1989)), a molecular circuit (T. Bein, P. Enzel, *Angew. Chem. Int. Ed. Engl.* 12:1737 (1989)), a photosensitive device (G. Grubert, M. Stockenhuber, O. P. Tkachenko, M. Wark, *Chem. Mater.* 14:2458 (2002)), a luminant (G. Calzaferri et al., *J. Mater. Chem.* 12:1 (2002)), a nonlinear optical material (S. D. Cox, T. E. Gier, G. D. Stucky, J. Bierlein, *J. Am. Chem. Soc.* 110:2986 (1988)) or a laser luminant (U. Vietze et al., Phys. Rev. Lett. 81:4628 (1998)).

In order to find application of zeolites and zeotype molecular sieves as innovative material and to overcome shortcomings associated with conventional linking approaches described previously, the present inventors have already suggested assembly methods in which nano- or micro-scaled zeolite particles are organized into uniformly aligned, two- or three-dimensional compact structures (zeolite supercrystals) (A. Kulak, Y.-J. Lee, Y. S. Park, K. B. Yoon, *Angew. Chem. Int. Ed.* 39:950 (2000); S. Y. Choi, Y.-J. Lee, Y. S. Park, K. Ha, K. B. Yoon, *J. Am. Chem. Soc.* 122:5201 (2000); A. Kulak, Y. S. Park, Y.-J. Lee, Y. S. Chun, K. Ha, K. B. Yoon, *J. Am. Chem. Soc.* 122: 9308 (2000); G. S. Lee, Y.-J. Lee, K. Ha, K. B. Yoon, *Tetrahedron* 56:6965 (2000); K. Ha, Y.-J. Lee, H. J. Lee, K. B. Yoon, *Adv. Mater.* 12:1114 (2000); K. Ha, Y.-J. Lee, D.-Y. Jung, J. H. Lee, K. B. Yoon, *Adv. Mater.* 12: 1614 (2000); G. S. Lee, Y.-J. Lee, K. B. Yoon, *J. Am. Chem. Soc.* 123:9769 (2001); K. Ha, Y.-J. Lee, Y. S. Chun, Y. S. Park, G. S. Lee, K. B. Yoon, *Adv. Mater.* 13:594 (2001); G. S. Lee, Y.-J. Lee, K. Ha, K. B. Yoon, *Adv. Mater.* 13:1491 (2001); Y. S. Chun, K. Ha, Y.-J. Lee, J. S. Lee, H. S. Kim, Y. S. Park, K. B. Yoon, *Chem. Comm.* 17:1846 (2002); J. S. Park, G. S. Lee, Y.-J. Lee, Y. S. Park, K. B. Yoon, *J. Am. Chem. Soc.* 124:13366 (2002); J. S. Park, Y.-J. Lee, K. B. Yoon, *J. Am. Chem. Soc.* 126:1934 (2004); K. Ha, J. S. Park, K. S. Oh, Y. S. Zhou, Y. S. Chun, Y.-J. Lee, K. B. Yoon, *Micropor. Mesopor. Mater.* 72:91 (2004)). Furthermore, the present inventors have developed a complex comprising mono- or multi-layered zeolites linked to substrates and its preparation method (see Korean Pat. No. 335966 and PCT/KR00/01002).

The patent documents disclose processes for forming a multi-layered film of molecular sieves onto substrates in which: (1) a covalent-linked substrate-linker (intermediate 1) and a covalent-linked zeolite-linker (intermediate 2) are linked via functional groups at the ends of linkers; (2) substrates or zeolites are directly attached to one terminal of linkers covalently bound to substrates or zeolites via their other terminal, (3) a middle linker is incorporated between the intermediates 1 and 2 to adjust the length between substrates and zeolites, and (4) repeating steps described (1)-(3) to form multi-layered film of molecular sieves on substrates. Although such processes contribute to applicability of substrate-molecular size composites as innovative materials, the refluxing step for linking between substrates and linkers, zeolite crystals and linkers, linkers and linkers, or linkers and intervening linkers gives rise to lower energy efficiency, attachment rate, degree of lateral close packing (DCP) between zeolite crystals and strength of linkage between zeolites and substrates.

Throughout this application, various patents and publications are referenced, and citations are provided in parentheses. The disclosure of these patents and publications in their entities are hereby incorporated by references into this application in order to more fully describe this invention and the state of the art to which this invention pertains.

DETAILED DESCRIPTION OF THIS INVENTION

The present inventors have made intensive researches to develop novel approaches for attaching molecular sieves to the surface of substrates in more stable and convenient manner. As a result, the present inventors have discovered that applying a physical pressure to molecular sieve crystals against a substrate enables molecular sieve crystals to be stably attached to substrates with significantly enhanced attachment rate, attachment content, degree of lateral close packing and attachment strength in more time-saving and energy-saving manner. In addition, the present inventors have found that molecular sieve crystals are attached to substrates in more diverse fashion if linking compounds are utilized.

Accordingly, it is an object of this invention to provide a method for preparing a composite of substrate-molecular sieve.

Other objects and advantages of the present invention will become apparent from the detailed description to follow taken in conjugation with the appended claims and drawings.

In one aspect of this invention, there is provided a method for preparing a composite of substrate-molecular sieve, which comprises applying a physical pressure to molecular sieve crystals against a substrate to form a chemical bond between the molecular sieve crystal and the substrate.

The present inventors have made intensive researches to develop novel approaches for attaching molecular sieves to the surface of substrates in more stable and convenient manner. As a result, the present inventors have discovered that applying a physical pressure to molecular sieve crystals against a substrate enables molecular sieve crystals to be stably attached to substrates with significantly enhanced attachment rate, attachment content, degree of lateral close packing and attachment strength in more time-saving and energy-saving manner. In addition, the present inventors have found that molecular sieve crystals are attached to substrates in more diverse fashion if linking compounds are utilized.

The present method may be applied to a variety of molecular sieves for attachment to substrates. The term used herein "molecular sieve" refers to materials capable of separating a given molecular from a mixture of different sized molecules.

Preferably, the molecular sieve useful in the present method includes all porous oxides or sulfides having hydroxyl groups on their surface. Atoms forming molecular sieves may be transition elements such as titanium, vanadium, zirconium, manganese, chromium, iron, cobalt, nickel, copper and zinc as well as main group elements such as silicon, aluminum, gallium, boron, phosphorous, oxygen and sulfur. The type of cations incorporated into pores or cations derived from a ship-in-a-bottle technique does not restrict the broadness of molecular sieves useful in the present invention.

Preferable examples of molecular sieves suitable in this invention are as follows:

1. natural and synthetic zeolites;
2. zeolites having MFI structure and their analogues (ZSM-5, silicalite-1, TS-1 or metalo-silicalite-1 with partially substituted transition metals);
3. zeolites having MEL structure and their analogues (ZSM-11, silicalite-2, TS-2 or metalo-silicalite-2 with partially substituted transition metals);
4. zeolites A, X, Y, L, beta, modenite, perialite, ETS-4 or ETS-10;
5. mesoporous silica (MCM series, SBA series, MSU series and KIT series);
6. other zeolites and zeotype molecular sieves (including mesoporous silica) generated through hydrothermal synthesis;
7. organic-inorganic complexed mesoporous structure and laminate; and
8. nanoporous materials called as organic zeolite, organic metal zeolite or coordinate compound zeolite in which metal ions and ligands are combined in a three-dimension to form nanopores.

According to the present invention, the crystals of molecular sieves are chemically attached to substrates. The substrates useful in this invention includes porous or non-porous supports. The term "substrate" used herein refers to a material capable of supporting films or thin layers.

The exemplified substrate useful in this invention includes:

1. materials containing hydroxyl groups on their surface, for example, oxides or mixed oxides of metals and non-metals such as silicon, aluminum, titanium, tin and indium, which can be used alone or in a mixture, for example, glass, quartz, mica, ITO glass (glass deposited with indium tin oxide), tin oxide ($SnO_2$), and other conductive glass, silica, porous silica, alumina, porous alumina, titanium dioxide, porous titanium dioxide, silicon wafer and the like;
2. metals capable of reacting with a thiol or amino group, such as gold, platinum, silver and copper;
3. polymers having various functional groups on their surface, such as PVC, a Merrifield peptide resin and the like;
4. semiconductive materials such as selenium-zinc (ZnSe), gallium-arsenic (GaAs) and indium-phosphor (InP);
5. natural or synthetic zeolite or zeotype molecules.
6. natural, synthetic or conductive materials of high molecular weight, which carry hydroxyl groups on their surface such as cellulose, starch (e.g., amylose and amylopectin) and lignin.

According to the present invention, substrates and molecular sieve crystals with no pretreatment may be used. The substrates and molecular sieve crystals with no pretreatment are called bare substrates and bare molecular sieve crystals, respectively. The substrates and molecular sieve crystals are chemically linked to each other through functional groups carried on them. Typically, the linkage between substrates and molecular sieve crystals is made through hydrogen bonds. In addition, the hydrogen bonds between substrates and molecular sieve crystals may be made using a suitable hydrogen bonding mediator for more strengthened hydrogen bonding. For example, where the surface of substrates and/or molecular sieve crystals is coated with hydrogen bonding mediators (by spin coating or dip coating) and molecular sieve crystals are subjected to physical pressing against the surface of substrates, the more stable and stronger linkages can be formed. Hydrogen bonding mediators useful in this invention includes, but not limited to, PEI (polyethylene imine), PyC (4-pyridinecarboxylic acid) and PyA [trans-3-(3-pyridyl)-acrylic acid]. Preferably, the hydrogen bonding mediator is PEI.

According to a preferred embodiment, substrates and molecular sieve crystals are chemically linked to each other with help of a linking compound. At this time, the substrate, the molecular sieve, or the substrate and the molecular sieve are linked to a linking compound.

The term "linking compound" used herein means any compound capable of mediating the linkages between molecular sieves and substrates, having a functional group at its terminal. Preferably, the linking compound is selected from the group consisting of compounds represented by the following formulae 1-11:

$$Z-L1-X \quad (1);$$

$$MR'_4 \quad (2);$$

$$R_3Si-L1-Y \quad (3);$$

$$HS-L1-X \quad (4);$$

$$HS-L1-SiR_3 \quad (5);$$

$$HS-L1-Y \quad (6);$$

$$Z-L2(+) \quad (7);$$

$$L3(-)-Y \quad (8);$$

$$Z-L3(-) \quad (9);$$

$$L2(+)-Y \quad (10); \text{ and}$$

$$Z-Y \quad (11);$$

wherein Z is $R_3Si$ or isocyanate (—NCO); R is halogen, $C_1$-$C_4$ alkoxy or $C_1$-$C_4$ alkyl and at least one of three Rs is halogen or alkoxy; L1 is a substituted or non-substituted $C_1$-$C_{17}$alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phospine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

More preferably, the linking compound includes compounds represented by the Formulae 7-11, still more preferably the Formulae 7-10, most preferably the Formulae 7-8.

According to a specific example of the present invention, the substrate is linked to the compound represented by the Formula 7 and the molecular sieve is linked to the compound represented by the Formula 8. Alternatively, the substrate is linked to the compound represented by the Formula 8 and the molecular sieve is linked to the compound represented by the Formula 7. Also, the substrate is linked to the compound represented by the Formula 9 and the molecular sieve is linked to the compound represented by the Formula 10. Alternatively, the substrate is linked to the compound represented by the Formula 10 and the molecular sieve is linked to the compound represented by the Formula 9.

Before linking molecular sieves to substrates, the substrate, the molecular sieve, or the substrate and the molecular sieve are reacted with the linking compound to contain suitable functional groups. As results, (substrate-linking compound) intermediates and/or (linking compound-molecular sieve crystal) intermediates are generated.

The (substrate-linking compound) intermediate and (linking compound-molecular sieve crystal) intermediate may be produced by use of various compounds and processes known to one of skill in the art. The surface of substrates and molecular sieve crystal used in this invention generally has functional groups such as hydroxyl group, hydroxyl group precursor or functional groups capable of converting to hydroxyl group. The examples of hydroxyl group precursor and functional groups capable of converting to hydroxyl group include acyloxy groups, methoxy group and Si=O group.

Although the (substrate-linking compound) intermediate and (linking compound-molecular sieve crystal) intermediate may be linked directed to each other, they may be also linked indirectly to each other through intervening linking compounds. The term "intervening linking compound" used herein refers to any compound having a functional group at its terminal and capable of forming the linkages between the (substrate-linking compound) intermediate and (linking compound-molecular sieve crystal) intermediate by linking two linking compounds bound to substrates and molecular sieve crystals. Preferably, the intervening linking compound is selected from the group consisting of fullerene ($C_{60}$, $C_{70}$), carbon nanotube, α, ω-dialdehyde, dicarboxylic acid, dicarboxylic acid anhydride, amine-dendrimer, polyethyleneimine, α, ω-diamine, metal porphyrin and complex compounds represented by M(salan) (M is cobalt, nickel, chrome, manganese or iron; and saline is N,N'-bis(salicylidene)ethylenediamine).

Where the linkages between substrates and molecular sieve crystal are made by use of linking compounds, ionic bonds are typically involved. For instance, the (linking compound-molecular sieve crystal) intermediate are rubbed on the (substrate-linking compound) intermediate, ionic bonds are stably formed between linking compounds of two intermediates.

The finally resulting substrate-molecular sieve composites prepared by the present invention can be diversely manufactured depending on types of substrates, molecular sieve particles (i.e., crystals), linking compounds and intervening linking compounds. Represented linkage patterns will be described in more detail as follows:

(i) First, one of represented patterns is a substrate-molecular sieve composite.

This composite may be produced by pressing molecular sieve crystals to be attached to substrates. The linking compounds are not used and molecular sieve crystals are linked to substrates via hydrogen bonds.

(ii) The second linkage pattern is a composite of (substrate-hydrogen bonding mediator-molecular sieve). The composite of (substrate-hydrogen bonding mediator-molecular sieve) is generated in such a manner that the surface of substrates and/or molecular sieve crystals is coated with hydrogen bonding mediators (by spin coating or dip coating) and molecular sieve crystals are subjected to physical pressing against the surface of substrates. This composite has hydrogen bonds stronger than those of the composites.

(iii) The third linkage pattern is a composite of (substrate-linking compound-molecular sieve).

After linking of the surface of substrates and molecular sieve crystals to suitable linking compounds, molecular sieve crystals are subjected to physical pressing against the surface of substrates to give the composite of (substrate-linking compound-molecular sieve).

(iv) The fourth linkage pattern is a composite of (substrate-linking compound-linking compound-molecular sieve).

For producing such pattern, a substrate is reacted with a linking compound to form an intermediate 1, a molecular sieve crystal is reacted with a linking compound to form an intermediate 2. The intermediates 1 and 2 are then combined by physical pressing to generate the composite of (substrate-linking compound-linking compound-molecular sieve). The linking compounds of the intermediates 1 and 2 have to contain functional groups capable of inducing the linkages between them. For example, ionic bonds (between ammonium groups and carboxyl groups or their salts) may be involved.

(v) The fifth linkage pattern is a composite of (substrate-linking compound-intervening linking compound-linking compound-molecular sieve).

For producing such pattern, a substrate is reacted with a linking compound to form an intermediate 1, a molecular sieve crystal is reacted with a linking compound to form an intermediate 2. To a mixture of the intermediates 1 and 2, an intervening linking compound are added and linkages between the intermediate 1, the intervening linking compound and the intermediate 2 are induced by physical pressing. Alternatively, after the intervening linking compound is first linked to the intermediate 1 or 2, the resultant is then linked to the intermediate 2 or 1.

Exemplary reaction pair of linking compound-intervening linking compound includes fullerene or carbon nanotube/amino terminal group, α, ω-dialdehyde, dicarboxylic acid or dicarboxylic acid anhydride/amino terminal group, amine-dendrimer/leaving group such as epoxy group and halogen, and polyethyleneimine or diamine/leaving group such as epoxy group and halogen. Another exemplary reaction pair includes a reaction pair of positively charged ammonium group-containing compound attached to molecular sieve and negatively charged sulfonate (e.g., poly(sodium 4-styrene-sulfonate)), and a reaction pair of negatively charged carboxyl group-containing compound attached to substrate and positively charged ammonium group-containing compound (e.g., poly(diallyldimethylammonium chloride)).

According to the present method, a physical pressing is simply applied to molecular sieve crystals for linking of substrates and molecular sieve crystals.

Such application of physical pressure is preferably performed by rubbing or pressing of molecular sieve crystals against substrates, more preferably rubbing. It could be appreciated that pressing of molecular sieve crystals against substrates and the forced surface migration of the crystals during rubbing are the two most important factors that led to the facile attachment of crystals on substrates with high degrees of close packing.

The rubbing method of this invention increases the reactivity of molecules (particularly, functional groups) involved in chemical bonds (particularly, ionic bonds or hydrogen bonds) between substrates and linking compounds, molecular sieve crystals and linking compounds, linking compounds and linking compounds or and linking compounds and intervening linking compounds.

The application of pressing for preparing substrate-molecular sieve composites may be performed by various methods known to one of skill in the art. For example, the application of pressing to molecular sieve crystals may be with bare hands, rubbing devices or rubbing apparatus.

The rubbing method of this invention is exemplified for laboratory-scale production as follows: As FIG. 2a, the powder of molecular sieve crystals is rubbed on substrates by use of naked finger for attachment of molecular sieve crystals to substrates. Alternatively, the rubbing is manually performed using a rubbing device for attachment of molecular sieve crystals to substrates, as shown in FIG. 2b. The rubbing device is conveniently prepared using silicone rubber, cloth or fibers.

The linkages between substrates and linking compounds, molecular sieve crystals and linking compounds, linking compounds and linking compounds or and linking compounds and intervening linking compounds are generated by rubbing, thereby producing substrate-molecular sieve composites. For preparing substrate-molecular sieve composites, the present invention requires no solvents, reactors and other equipments such as sonicators, heaters, stirrers and condersers.

According to a preferred embodiment, the molecular sieve crystals used in this invention are microcrystals. The term used herein "microcrystals" refers to crystals having a size of 0.1-500 μm. The term used herein "size" in conjunction to molecular sieve crystals means the length of the long axis (generally, c-axis) in three-dimensional structure of molecular sieve crystals. FIG. 7 schematically represents the molecular sieve crystals. More preferably, the molecular sieve crystals used in this invention has the size of 0.1-50 μm, still more preferably 0.3-30 μm, still yet more preferably 0.3-20 μm and most preferably 0.4-15 μm.

According to conventional self assembly and sonication with stacking (SS) method [10], the molecular sieve crystals of more than 3 μm are very unlikely to be attached to substrates in high lateral close packing. However, the present method enables the microcrystals with the sizes of more than 3 μm to be attached to substrates with higher degree of lateral close packing and attachment rate.

According to the present method, molecular sieve crystals are chemically bonded to the surface of substrates in a direct or indirect manner. The chemical bonds include non-covalent bonds, ionic bonds, covalent bonds and coordinate bonds. Preferably, the chemical bond formed by the present method is ionic bonds or hydrogen bonds. For example, among the linkage patterns described above, the composite formed by hydrogen bonds is (i) a substrate-molecular sieve composite, (ii) a composite of (substrate-hydrogen bonding mediator-molecular sieve) and (iii) a composite of (substrate-linking compound-molecular sieve). The composite formed by hydrogen bonds is (iv) a composite of (substrate-linking compound-linking compound-molecular sieve) and (v) a composite of (substrate-linking compound-intervening linking compound-linking compound-molecular sieve).

According to a preferred embodiment, the molecular sieve crystals attached to the substrate are aligned with b-axis perpendicular to the plane of the substrate. The b-axis orientation is described in FIG. 7. In detail, the molecular sieve crystals are uniformly aligned with a single orientation and in the molecular sieve crystals are therefore uniformly aligned. The uniform alignment ensures the application and effectiveness of molecular sieves to become maximized.

According to a preferred embodiment, the molecular sieve crystals attached to the substrate are substantially freed from parasitic crystals. The parasitic crystals grown in mother crystals are responsible for the decrease in functions of molecular sieves. However, the present method enables monolayer of molecular sieves to be formed on substrates with no parasitic crystals.

A molecular sieve monolayer is first formed on a substrate according to the present method described above and then further combined with a second molecular sieve crystal to obtain bilayer. These procedures are performed repeatedly to give multilayer. The second molecular sieve crystal may be the same as or different from the molecular sieve for monolayer. Lamination patterns include, but not limited to, (substrate-linking compound-molecular sieve crystal)-(linking compound-molecular sieve crystal) and (substrate-linking compound)-(linking compound-molecular sieve crystal-linking compound)-(linking compound-molecular sieve crystal).

Alternatively, a molecular sieve monolayer is first formed on a substrate according to the present method described above and then calcined at high temperatures to remove linking compounds, thereby forming direct linkages (e.g., silicon-oxygen-silicon) between substrates and molecular sieves. These procedures are performed repeatedly to give multilayer containing direct linkages between substrates and molecular sieves. Meanwhile, it could be understood to one of skill in the art that the present method described hereinabove may be applied to preparation of films of molecular sieve crystals according to conventional techniques.

The features and advantages of this invention are will be summarized as follows:

(i) The present method ensures the alignment and linkages of molecular sieve crystals to the surface of substrates by the simplest procedure in which a physical pressure is applied to molecular sieve crystals against the surface of substrates. The present invention does not require solvents, reactors and other equipments.

(ii) According to the present method, molecular sieve crystals are stably linked to the surface of substrates through various chemical bonds (particularly, ionic bonds or hydrogen bonds).

(iii) The present invention ensures the synthesis of substrate-molecular sieve composites with enhanced attachment rate, degree of lateral close packing (DCP) and attachment strength (iv) The present method can be performed in more time-saving and energy-saving manners.

(v) The present method works well for molecular sieve crystals with lager sizes (e.g., more than 3 μm).

(vi) The present method works well for a variety of molecular sieve crystals with various sizes.

(vii) The present method ensures the alignment and linkages of molecular sieve crystals to the surface of substrates with no generation of parasitic crystals.

(viii) The molecular sieve crystals in substrate-molecular sieve composites prepared by the present method are aligned with b-axis perpendicular to the plane of the substrate.

(ix) The present invention shows excellent applicability to large substrates, enabling the mass production of substrate-molecular sieve composites.

BRIEF DESCRIPTION OF THE DRAWINGS

The patent or application file contains at least one drawing executed in color. Copies of this patent or application publication with color drawing(s) will be provided by the Office upon request and payment of the necessary fee.

Figure 1:
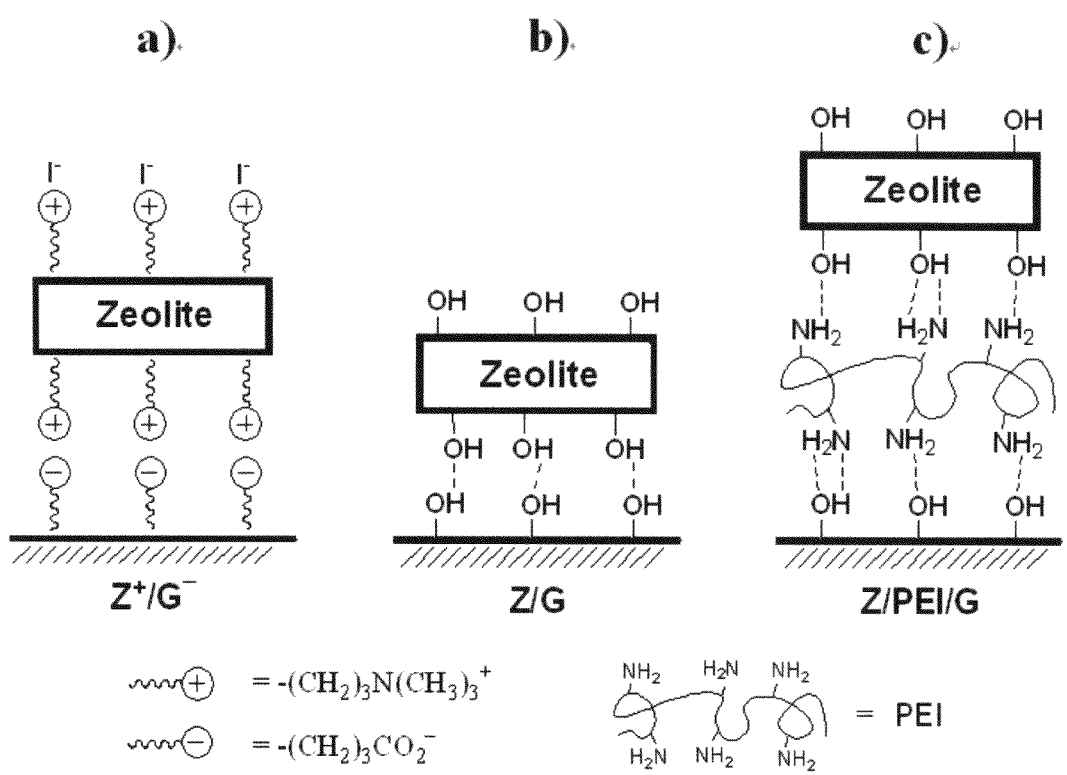
FIG. 1 schematically represents types of bonding that were effective for the monolayer assembly of zeolite microcrystals on substrates, a) ionic bonding between the zeolite-tethered trimethylpropyl ammonium and glass-tethered butyrate, b) hydrogen bonding between the surface hydroxyl groups of zeolite and glass, and c) polyethylene-mediated hydrogen bonding between the surface hydroxyl groups of zeolite and glass.

The present invention will now be described in further detail by examples. It would be obvious to those skilled in the art that these examples are intended to be more concretely illustrative and the scope of the present invention as set forth in the appended claims is not limited to or by the examples.

EXAMPLES

Example 1

Preparation of Silicalite Monolayer Using Polyethyleneimine (PEI)

Preparation of Polyethyleneimine-Tethered Glass Plates

Glass plates (18×18 mm$^2$, Marienfeld) were immersed in piranha solution ($H_2SO_4$:$H_2O_2$=7:3) for 30 min and washed with distilled water, followed by drying under nitrogen atmosphere. The dried glass plates were coated with polyethyleneimine (PEI, Aldrich, $M_w$=25000) diluted in ethanol by spin coating, resulting in the production of PEI-tethered glass plates, PEI-G. Finally, the PEI-G glass plates were dried under nitrogen atmosphere.

Preparation of Silicalite Monolayer by Rubbing

The PEI-G plates were placed on a clean filter or weighing paper and fixed with adhesive tapes. Bare zeolite crystals were attached onto the surface of the PEI-G plates by rubbing.

Silicalites with different crystal sizes were synthesized as follows: Silicalites with four different average sizes (0.3× 0.1×0.6, 1.3×0.5×1.7, 2.5×1.2×4.1, and 4.6×1.5×11 μm$^3$) were prepared using a synthesis gel composed of TEOS (tetraethyl orthosilicate, TEOS, Aldrich):TPAOH(tetrapropylammonium hydroxide, ACROS):$H_2O$=6:3:330, 6:2.2:330, 6:1:330 and 7:0.9:460, respectively. TEOS was added to TPAOH solution. The clear gel was agitated for 12 hr at room temperature and subjected to heat treatment for 6 hr at 170° C. in an autoclave to produce silicalite crystals. The silicalite crystals were completely washed with excess distilled water. Afterwards, template ions (tetrapropylammonium) were removed by calcinations at 550° C. for 12 hr.

Example 2

Preparation of Zeolite a Monolayer Using Polyethyleneimine (PEI)

Zeolite A monolayer was formed on the glass surface according to procedures of Example 1, except that zeolite A as molecular sieve particles was used instead of silicalite.

Example 3

Preparation of Soil Particle (Layer Structure Material) Monolayer Using Polyethyleneimine (PEI)

Soil-particle monolayer was formed on the glass surface according to procedures of Example 1, except that soil particles as molecular sieve particles were used instead of silicalite.

Example 4

Preparation of Zeolite Y Monolayer Using Polyethyleneimine (PEI)

Zeolite Y monolayer was formed on the glass surface according to procedures of Example 1, except that zeolite Y as molecular sieve particles was used instead of silicalite.

Example 5

Preparation of ETS-10 Monolayer Using Polyethyleneimine (PEI)

ETS-10 monolayer was formed on the glass surface according to procedures of Example 1, except that ETS-10 as molecular sieve particles was used instead of silicalite.

Example 6

Preparation of Silicalite Monolayer Through Ionic Bonding

Preparation of 3-Cyanopropyltrichlorosilane-Tethered Glass Plates and Aminopropyl-Tethered Silicalite Glass plates were kept for 6 hr in a hexane solution (50 ml) containing 3-cyanopropyltrichlorosilane ($Cl_3Si(CH_2)_3CN$, 98%, Merck). The 3-cyanopropyl-tethered glass plates were immersed in concentrated hydrochloric acid and heated for 1 hr at 95-100° C. The cyano groups were converted to carboxylic acid. The carboxyl-tethered glass plates (glass-$(CH_2)_3CO_2H$) were taken out and immersed in saturated $NaHCO_3$ solution for 12 hr, which induces the replacement of hydrogen by Na through neutralization, thereby yielding sodium butyrate [—$(CH_2)_3CO_2^-Na^+$]-tethered glass plates ($Na^+Bu^-/G$).

The 3-aminopropyl-tethered silicalite was agitated for 24 hr at 60° C. in 90% ethanol solution containing $NaHCO_3$ and methyliodide ($CH_3I$, 99%, Aldrich). The trimethylpropylammonium iodide [$(CH_2)_3N(CH_3)_3^+I^-$]-tethered zeolite ($TMP^+I^-/Z$) was filter though a filter paper and washed with ethanol and distilled water.

Preparation of Silicalite Monolayer by Rubbing

One plate or several plates of the $Na^+Bu^-/G$ were placed on a clean filter or weighing paper and fixed with adhesive tapes. The $TMP^+I^-/Z$ silicalite was placed on the glass plates and then were attached onto the surface of the [—$(CH_2)_3CO_2^-Na^+$]-tethered glass plates by rubbing.

Example 7

Preparation of Silicalite Monolayer Using Polymeric Electrolyte

Preparation of Glass Plates ($PDDA^+/G^-$) by Ionic Bonds (Between Carboxyl Group or its Salt and Poly(diallyldimethylammonium chloride) [$PDDA^+Cl^-$])

The [—$(CH_2)_3CO_2^-Na^+$]-tethered glass plates were subject to spin coating by use of positive-charged poly(diallyldimethylammonium chloride) (Aldrich). Alternatively, the [—$(CH_2)_3CO_2^-Na^+$]-tethered glass plates were immersed for about 10 min in aqueous solution containing poly(diallyldimethylammonium chloride) and washed with water, followed by drying.

Preparation of Glass Plates ($PSS/PDDA^+/G^-$) by Ionic Bonds (Between Positive-Charged Polymeric Electrolyte and Poly (Sodium 4-Styrenesulfonate))

The $PDDA^+/G^-$ glass plates were subject to spin coating by use of negative-charged poly(sodium 4-styrenesulfonate) (Aldrich). Alternatively, the $PDDA^+/G^-$ glass plates were immersed for about 10 min in aqueous solution containing poly(sodium 4-styrenesulfonate) and washed with water, followed by drying.

Preparation of Glass Plates (. . . / . . . /$PDDA^+/PSS/PDDA^+/G^-$) by Several-Layered Ionic Bonds (Coated with Several Layers of Positive-Charged Polymeric Electrolytes and Negative-Charged Polymeric Electrolytes)

The positive-charged polymeric electrolytes and the negative-charged polymeric electrolytes described above were alternatively spin-coated on the glass plates. Also, the glass plates were alternatively immersed in each of aqueous solutions containing the positive-charged polymeric electrolytes or the negative-charged polymeric electrolytes.

Preparation of Silicalite Monolayer by Rubbing

The formation of silicalite monolayer on the glass plates were carried out according to procedures of Example 1, except that the [$(CH_2)_3N(CH_3)_3^+I^-$]-tethered silicalite was used instead of bare silicalite and the $PSS/PDDA^+/G^-$ glass plates, $PSS/PDDA^+/PSS/PDDA^+/G^-$ glass plates or other glass plates with alternative coatings of different-charged polymeric electrolytes.

Results

Atoms, molecules, enzymes, proteins, DNAs, RNAs, nanoparticles, microparticles, tiles, and fire bricks are the most commonly encountered building blocks in chemistry and architecture. These building blocks can be grouped into subnano (atoms), nano (molecules, enzymes, proteins, DNAs, RNAs, and nanoparticles), micro (microparticles), and milli-to-centi (tiles and fire bricks) building blocks based on their sizes.

One of the important applications of the building blocks is to organize them as monolayers on various substrates. While self-assembly has been the method for organization of nano[1-5] and micro[6-25] building blocks as monolayers on substrates, direct attachment with hands (DAWH) or direct pressing of the building blocks against the adhesive-coated substrates with hands has been the method for organization of milli-to-centi building blocks as monolayers on substrates (floors and walls). Thus, the method for monolayer attachment of building blocks on substrates has to switch from self assembly to DAWH at some stage as the size of the building block increases.

The present inventors suggest that a direct physical pressure to zeolite crystals is very advantageous in their assembly.

We used zeolite microcrystals as the model microcrystals because they can be produced in fairly uniform sizes and shapes and their monolayers can be applied as molecular sieve membranes,[17-20] low dielectric materials,[24,27] supramolecular energy transfer systems,[13-16] nonlinear optical films,[28] anisotropic photoluminescence,[12] and other advanced materials.[29]

Silicalite-1 and ETS-10 were used in this study. In the case of silicalite-1, four different average sizes [a×b×c μm$^3$ (volume, μm$^3$)], namely, 0.3×0.1×0.6 (0.03), 1.3×0.5×1.7 (1.06), 2.5×1.2×4.1 (12.3), and 4.6×1.5×11 μm$^3$ (72.5 μm$^3$) were used and in the case of ETS-10, only a batch of microcrystals with the average size of 12×12×7 μm$^3$ (1008 μm$^3$) was used. The volume ratio of the crystals was 1:35:410:2420:33600. Glass plates with two different sizes, 18×18 and 150×150 mm$^2$, were used as the substrates. Among various tested types of bonding between microcrystals and substrates we found that both ionic bonding and hydrogen bonding (FIG. 1) were most effective for the monolayer assembly of microcrystals by the present invention.

The ionic bonding was induced between trimethylpropylammonium (TMP$^+$) groups tethered to silicalite-1 (TMP$^+$-SL) surfaces and butyrate (Bu$^-$) groups tethered to glass (Bu$^-$-GL) plates (FIG. 1a). In the case of hydrogen-bonding, two types were tested; the hydrogen bonding between the surface hydroxyl groups of bare zeolite crystals and bare glass substrates (FIG. 1b) and the hydrogen bonding between the surface hydroxyl groups of bare zeolite crystals and polyethyleneimine and between polyethyleneimine and the surface hydroxyl groups of bare glass substrates (FIG. 1c). The effectiveness of hydrogen bonding for the monolayer assembly becomes higher for the intervention of polyethylenimine.

As a practical example of the present invention, zeolite powders were rubbed on substrates with a finger. The typical rubbing period was 10-20 sec for the glass plates with the size of 18×18 mm$^2$. For comparison, the sonication-with-stacking (SS) method[10] was also used for the monolayer assembly of TMP$^+$-SL microcrystals on Bu$^-$-GL.

Figure 3:
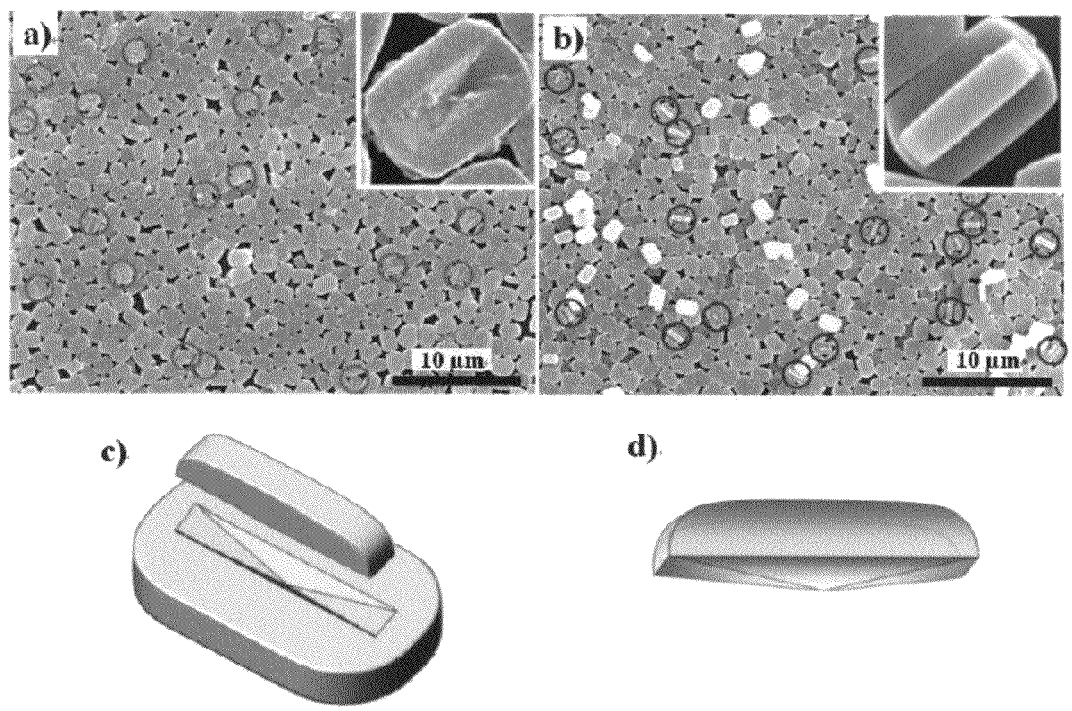
FIG. 3 is SEM (scanning electron microscope) images of the monolayers of $TMP^+$-SL microcrystals (size=1.3×0.5× 1.7 μm$^3$) assembled on $Bu^-$-GL plates by rubbing (a) and sonication-with-stacking (SS) method. Exploded structures of mother and parasitic crystals that were drawn based on the inset of a and the twined crystals in b (c) and the perspective view of the parasitic crystal (d).

A typical scanning electron microscope (SEM) image of the monolayer of TMP$^+$-SL microcrystals (size=1.3×0.5×1.7 μm$^3$) prepared on a Bu$^-$-GL plate by rubbing is shown in FIG. 3a. For comparison, a monolayer of the same TMP$^+$-SL microcrystals on a Bu$^-$-GL plate prepared by the SS method is shown in FIG. 3b. As noted, the degrees of coverage and the degrees of close packing of the microcrystals in the monolayers in both cases were very similar, despite the fact that rubbing is incomparably simpler than the SS method and it does not require solvents, reactors, and equipments (such as a sonic bath) and despite the fact that the required period for monolayer assembly was much shorter; 10-20 sec in the case of rubbing vs. 90 sec in the case of SS.

Furthermore, there were no physically adsorbed second-layer crystals on the microcrystal monolayers prepared by the present method, indicating that the weakly adhered microcrystals were removed from the chemically attached crystals during rubbing.

More interestingly, while the monolayers of TMP$^+$-SL crystals prepared by the SS method have many crystals having a 90°-intergrown parasitic crystal[30,31] on the (010) plane of the mother crystal with its a-axis perpendicular to the (010) plane of the mother crystal (see the inset and the circled crystals in FIG. 3b), the monolayers prepared by the present invention did not have such crystals since all the parasitic components were dislodged from the mother crystals during the monolayer assembly (see the inset and the circled crystals in FIG. 3a). Although it has been shown that the parasitic 90°-intergrown crystals can be removed by strong sonication when the crystals are large (>20 μm),[30] there have been no methods to remove the parasitic crystals from the smaller crystals.

In fact, it is very difficult to synthesize batches of silicalite crystals that are completely free from intergrown crystals. Accordingly, preparation of the monolayers of silicalite-1 crystals free from twined crystals and the corresponding preparation of the continuous silicalite-1 films with perfect b-orientation (with no partial a-oriented spots) by secondary growth has been difficult. Now the rubbing method enables the monolayer assembly of the silicalite-1 crystals free from parasitic crystals.

Figure 4:
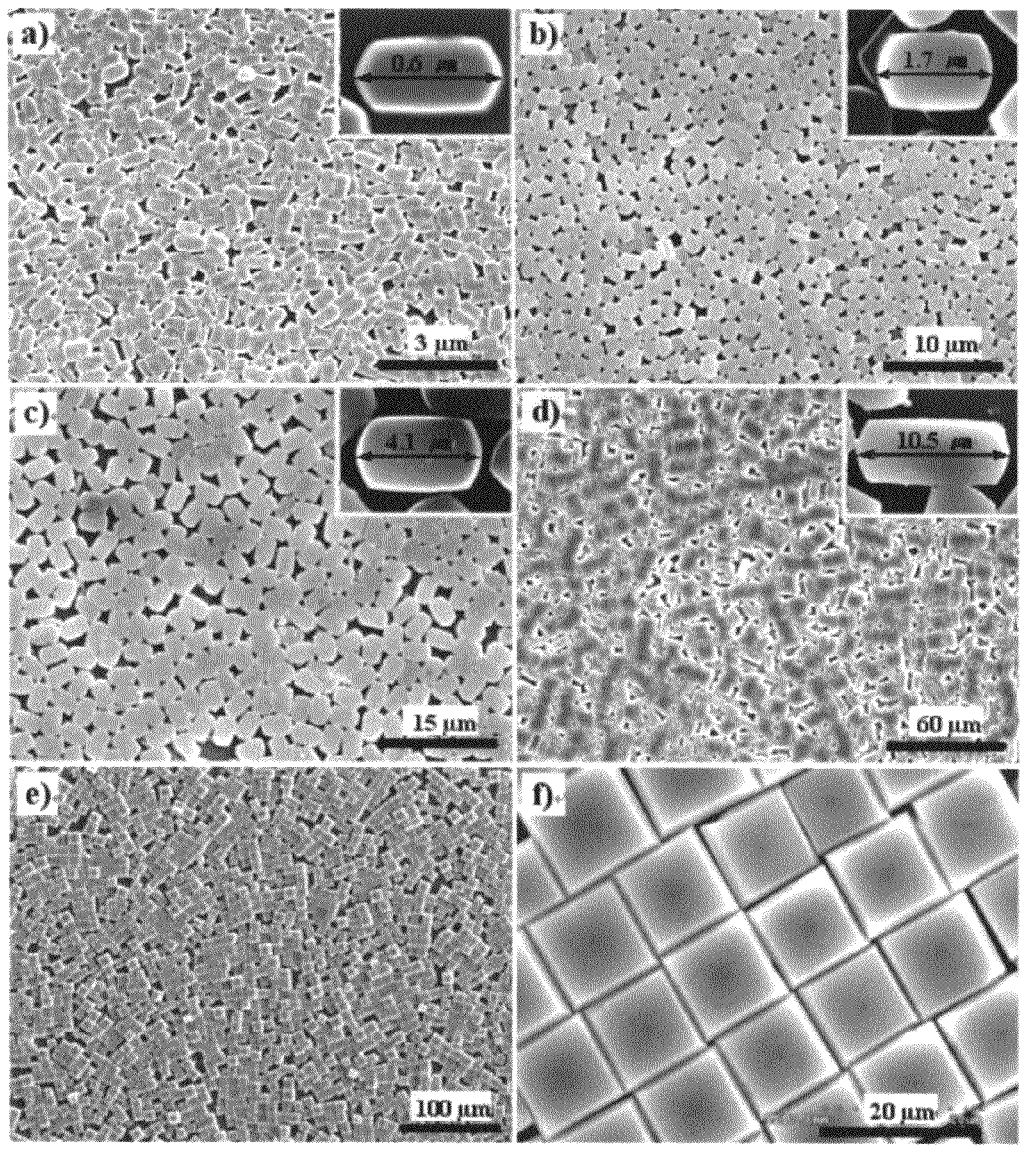
FIG. 4 is SEM images of $TMP^+$-SL crystals of different average sizes (a-d) (as shown in each inset) and $TMP^+$-coated ETS-10 crystals (12×12×7 μm$^3$) at magnifications of 300 (e) and 2000 (f), respectively.

FIG. 4 shows the SEM images of the monolayers of silicalite (a-d) and ETS-10 (e, f) crystals which were formed by the present invention. The above images emphasize an important fact that, rubbing, although it is a very simple process, yet yields high quality monolayers regardless of the crystal size that varied from 0.5 to 12 μm. Although we could not carry out the experiment with the zeolite microcrystals which are bigger than 12 μm, due to the difficulty to obtain such large microcrystals in uniform sizes and shapes, we believe that rubbing would work equally well for the monolayer assembly of microcrystals larger than 12 μm. Due to the difficulty to prepare smaller crystals with flat faces in fairly uniform sizes smaller than 0.5 μm, the present would work equally well for the monolayer assembly of microcrystals with the sizes smaller than 0.5 μm.

Figure 5:
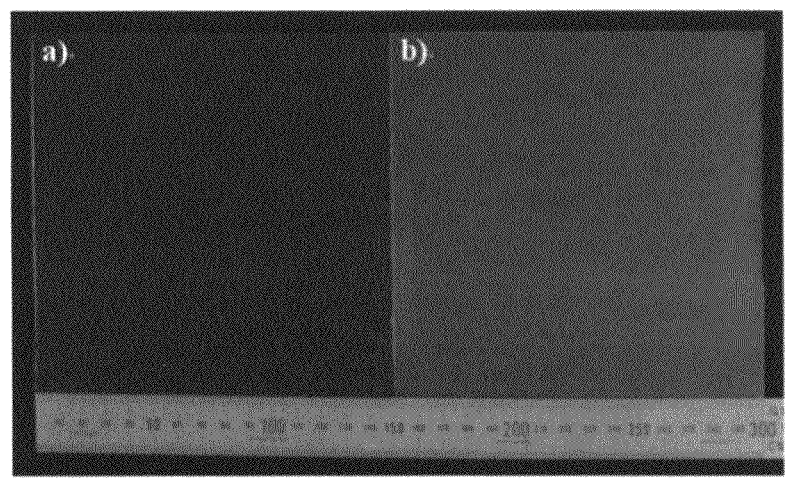
FIG. 5 is photographic images of large glass plates (150× 150 mm$^2$) before (a) and after (b) monolayer assembly of silicalite microcrystals (1.3×0.5×1.7) using PEI as the interfacial hydrogen bonding mediator.
Figure 6:
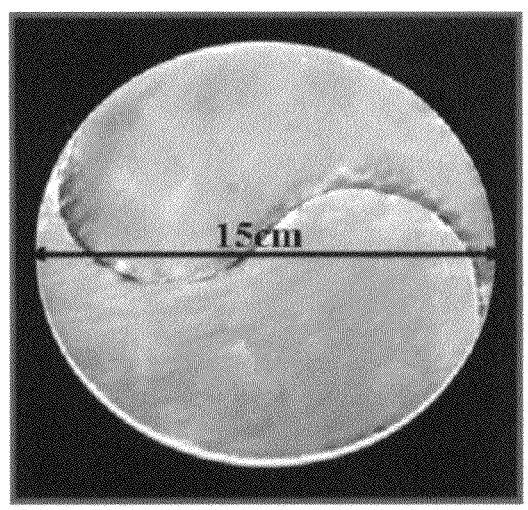
FIG. 6 represents alignments of silicalite monolayers with different colors by the present method.
Figure 7:
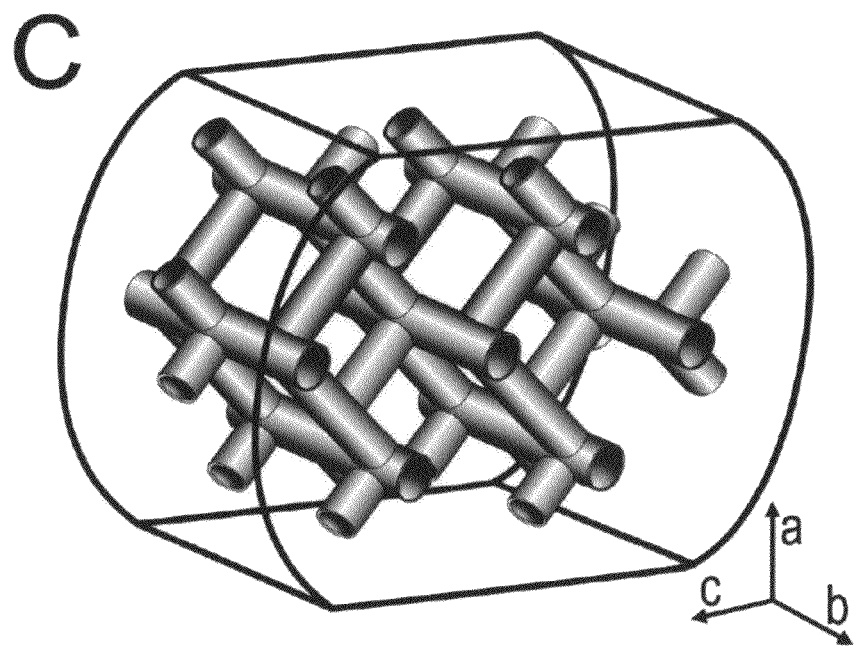
FIG. 7 schematically represents zeolite crystals. The channels shown in a zeolite crystal are formed by pores of zeolite.

In addition to the aforementioned advantages, the present method is much more effective for the monolayer assembly of microcrystals on large-area substrates in high speed. For instance, a 150×150 mm$^2$-sized glass plate (FIG. 5) can be covered with a high quality monolayer of silicalite-1 crystals with the average size of about 2 μm within 1 min by the present method. We believe that the rate can be increased even further by optimizing the procedure. This feature will enable mass production of microcrystal-coated very large substrates, which will be very useful for the application of the supported zeolite microcrystal monolayers for various applications such as high throughput membrane filters,[17-20] supramolecular light harvesting systems,[13-16] and nonlinear optical applications.[28] Patterned monolayer assembly can also be achieved by rubbing the zeolite microcrystals on selected areas.[32-34]

Interestingly, we found that hydrogen bonding is also effective for the monolayer assembly of microcrystals on substrates by the present method. Thus, when freshly calcined bare silicalite powders were rubbed on clean bare glass plates (FIG. 1b), high-quality monolayers of silicalite crystals were formed on the substrate. We found that the use of polyethylene imine (PEI) as the intermediate hydrogen bonding mediator (FIG. 1c) is highly advantageous for the assembly of high quality monolayers of large silicalite-1 and ETS-10 microcrystals.

We believe that 'pressing' of the microcrystals against the substrate and the forced surface migration of the crystals during rubbing are the two most important factors that led to the facile attachment of crystals on substrates with high degrees of close packing. Use of a folded flexible rubber sheet (width: ~45 mm, length: ~30 mm) or a folded piece of ultrafine-threaded cloth (width: ~75 mm, length: 35 mm)

Figure 2A:
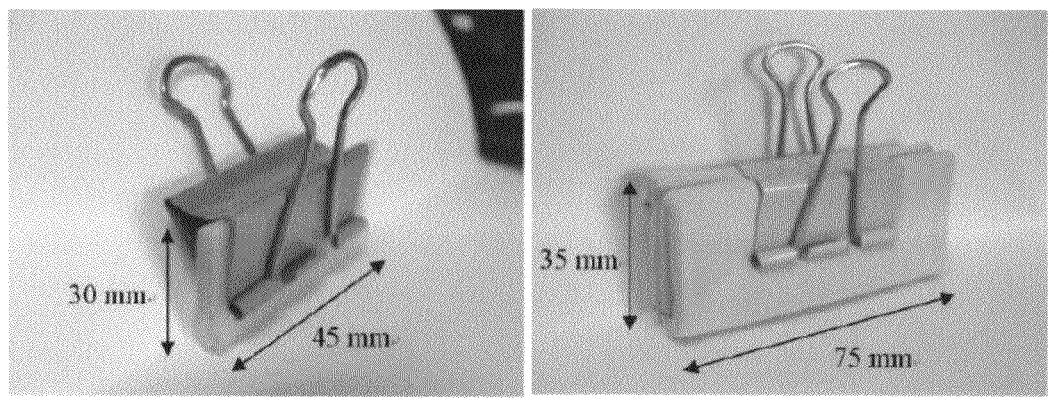
FIG. 2a represents one embodiment of devices for preparing substrate-molecular sieve composites by rubbing. The device is comprised of silicon rubber or fibers fixed in tongs.
Figure 2B:
FIG. 2b is photographic images showing the process of monolayer assembly of silicalite microcrystals on glass through ionic bonding by rubbing.

(FIG. 2) was also as effective as the use of fingers. The pressing using other devices apparatus than fingers will be helpful for mass production of microcrystal monolayers on large substrates.

As described hereinabove, the present invention provides a method for preparing a composite of substrate-molecular sieve. The present invention requiring no solvents, reactors and other equipments enables molecular sieve crystals to be stably attached to the surface of substrates through ionic or hydrogen bonds. In addition, the present invention ensures the synthesis of substrate-molecular sieve composites with enhanced attachment rate, degree of lateral close packing (DCP) and attachment strength in more time-saving and energy-saving manners. The present method works well for molecular sieve crystals with lager sizes (e.g., more than 3 µm) with no generation of parasitic crystals. Furthermore, the present invention shows excellent applicability to large substrates, enabling the mass production of substrate-molecular sieve composites.

Having described a preferred embodiment of the present invention, it is to be understood that variants and modifications thereof falling within the spirit of the invention may become apparent to those skilled in this art, and the scope of this invention is to be determined by appended claims and their equivalents.

REFERENCES

[1] a) M. C. Petty, LangmuirBlodgett films An introduction, Cambrigde, 1996. b) A. Ulman, Chem. Rev. 1996, 96, 1533-1554. c) A. Riklin, I. Willner, Anal. Chem. 1995, 67, 4118-4126.
[2] a) G. Shen, N. Tercero, M. A. Gaspar, B. Varughese, K. Shepard, R. Levicky, J. Am. Chem. Soc. 2006, 128, 8427-8433. b) E. Katz, Y. Weizmann, I. Willner, J. Am. Chem. Soc. 2005, 127, 9191-9200. c) D. Liu, L. A. Gugliotti, T. Wu, M. Dolska, A. G. Tkachenko, M. K. Shipton, B. E. Eaton, D. L. Feldheim, Langmuir. 2006, 22, 5862-5866.
[3] N. Keegan, G. Nicholas, J. H. Lakey, Angew. Chem., Int. Ed. 2005, 44, 4801-4804.
[4] N. Haddour, S. Cosnier, C. Gondran, J. Am. Chem. Soc. 2005, 127, 5752-5753.
[5] T. P. Bigioni, X.-M. Lin, T. T. Nguyen, T. Toan, E. I. Corwin, Nat. Mater. 2006, 5, 265-270.
[6] a) K. B. Yoon, Bull. Kor. Chem. Soc. 2006, 27, 17-26. b) K. B. Yoon Acc. Chem. Res. 2006, in press.
[7] G. S. Lee, Y.-J. Lee, K. B. Yoon, J. Am. Chem. Soc. 2001, 123, 9769-9779.
[8] J. S. Park, G. S. Lee, Y.-J. Lee, Y. S. Park, K. B. Yoon, J. Am. Chem. Soc. 2002, 124, 13366-13367.
[9] A. Kulak, Y. S. Park, Y.-J. Lee, Y. S. Chun, K. Ha, K. B. Yoon, J. Am. Chem. Soc. 2000, 122, 9308-9309.
[10] J. S. Lee, K. Ha, Y.-J. Lee, K. B. Yoon, Adv. Mater. 2005, 17, 837-841.
[11] K. Ha, Y.-J. Lee, H. J. Lee, K. B. Yoon, Adv Mater. 2000, 12, 1114-1117.
[12] J. S. Lee, H. Lim, K. Ha, H. Cheong, K. B. Yoon, Angew. Chem., Int. Ed. 2006, 45, 5288-5292.
[13] J.-W. Li, K. Pfanner, G. Calzaferri, J. Phys. Chem. 1995, 99, 2119-2126.
[14] P. Laine, R. Seifert, R. Giovanoli, G. Calzaferri, New J. Chem. 1997, 21, 453-460.
[15] G. Calzaferri, O. Bossart, D. Bruhwiler, S. Huber, C. Leiggener, M. K. Van Veen, A. Z. Ruiz, C. R. Chimie 2006, 9, 214-225.
[16] A. Z. Ruiz, H. Li, G. Calzaferri, Angew. Chem., Int. Ed. 2006, 45, 5282-5287.
[17] J. A. Lee, L. Meng, D. J. Norris, L. E. Scriven, M. Tsapatsis, Langmuir. 2006, 22, 5217-5219.
[18] Z. P. Lai, G. Bonilla, I. Diaz, J. G. Nery, K. Sujaoti, M. A. Amat, E. Kokkoli, O. Terasaki, R. W. Thompson, M. Tsapatsis, D. G. Vlachos, Science 2003, 300, 456-460.
[19] G. T. P. Mabande, S. Ghosh, Z. P. Lai, W. Schwieger, M. Tsapatsis, Ind. Eng. Chem. Res. 2005, 44, 9086-9095.
[20] L. C. Boudreau, J. A. Kuck, M. Tsapatsis, J. Mem. Sci. 1999, 152, 41-59.
[21] T. Bein, MRS Bulletin 2005, 30, 713-720.
[22] S. Mintova, B. Schoeman, V. Valtchev, J. Sterte, S. Y. Mo, T. Bein, Adv. Mater. 1997, 9, 585-589.
[23] Y. Yan, T. Bein, J. Phys. Chem. 1992, 96, 9387-9393.
[24] S. Li, Z. Li, K. N. Bozhilov, Z. Chen, Y. Yan, J. Am. Chem. Soc. 2004, 126, 10732-10737.
[25] T. Ban, T. Ohwaki, Y. Ohya, Y. Takahashi, Angew. Chem., Int. Ed. 1999, 38, 3324-3326.
[26] A. R. Pradhan, M. A. Macnaughtan, D. Raftery, J. Am. Chem. Soc. 2000, 122, 404-405.
[27] a) Z. Wang, A. Mirta, H. Wang, L. Huang, Y. Yan, Adv. Mater. 2001, 13, 1463-1466. b) Z. Wang, A. Mirta, H. Wang, L. Huang, Y. Yan, Adv. Mater. 2001, 13, 746-749
[28] a) H. S. Kim, S. M. Lee, K. Ha, C. Jung, Y.-J. Lee, Y. S. Chun, D. Kim, B. K. Rhee, K. B. Yoon, J. Am. Chem. Soc. 2004, 126, 673-682. b) H. S. Kim, M. H. Lee, N. C. Jeong, S. M. Lee, B. K. Rhee, K. B. Yoon, J. Am. Chem. Soc. 2006, in press.
[29] F. Schüth, W. Schmidt, Adv. Mater. 2002, 14 629-638.
[30] D. G. Hay, H. Jaeger, K. G. Wilshier, Zeolites. 1990, 10, 571-576
[31] a) G. D. Price, J. J. Pluth, J. V. Smith, J. M. Bennett, R. L. Patton, J. Am. Chem. Soc. 1982, 104, 5971-5977 b) C. Weidenthaler, R. X. Fischer, R. D. Shannon, O. Medenbach, J. Phys. Chem. 1994, 98, 12687-12694 c) O. Geier, S. Vasenkov, E. Lehmann, J. Kärger, U. Schemmert, R. A. Rakoczy, J. Weitkamp, J. Phys. Chem. B. 2001, 105, 10217-10222.
[32] a) K. Ha, Y.-J. Lee, D. Y. Jung, J. H. Lee, K. B. Yoon, Adv. Mater. 2000, 12, 1614-1617. b) K. Ha, Y.-J. Lee, Y. S. Chun, Y. S. Park, G. S. Lee, K. B. Yoon, Adv. Mater. 2001, 13, 594-596. c) J. S. Park, G. S. Lee, K. B. Yoon, Microporous Mesoporous Mater. 2006, 4, in press.
[33] a) S. Li, C. Demmelmaier, M. Itkis, Z. Liu, R. C. Haddon, Y. Yan, Chem. Mater. 2003, 15, 2687-2689. b) L. Huang, Z. Wang, J. Sun, L. Miao, Q. Li, Y. Yan, D. Zhao, J. Am. Chem. Soc. 2000, 122, 3530-3531.
[34] P. D. Yang, T. Deng, D. Y. Zhao, P. Y. Feng, D. Pine, B. F. Chmelka, G. M. Whitesides, G. D. Stucky, Science 1998, 282, 2244-2246.

What is claimed is:

1. A method for preparing a composite of substrate-molecular sieve, which comprises applying a physical pressure to molecular sieve crystals against a substrate to form a chemical bond between the molecular sieve crystal and the substrate, and to align the molecular sieve crystals with a single orientation in a monolayer on the substrate, and the method further includes the substrate, the molecular sieve or the substrate and the molecular sieve linked to a linking compound.

2. The method according to claim 1, wherein the molecular sieve is selected from the group consisting of: (i) zeolites; (ii) zeolites having MFI structure; (iii) zeolites having MEL structure; (iv) zeolites A, X, Y, L, beta, modenite, perialite, ETS-4 and ETS-10; (v) mesoporous silica; (vi) organic-inorganic complexed mesoporous structure and laminate; and (vii) organic zeolite, organic metal zeolite or coordinate compound zeolite in which metal ions and ligands are combined in a three-dimension to form nanopores.

3. The method according to claim 1, wherein the substrate is materials having hydroxyl groups on their surface and comprising metal oxides or mixed oxides of metals and non-metals; (ii) metals capable of reacting with a thiol or amine group (—$NH_2$); (iii) polymers having functional groups on their surface; (iv) semiconductive materials; (v) zeolite or zeotype molecules; or (vi) natural polymers, synthetic polymers or conductive polymers carrying hydroxyl groups on their surface.

4. The method according to claim 1, wherein the linking compound is selected from the group consisting of compounds represented by the following Formulae 1-11:

Z-L1-X    (1);

M$R'_4$    (2);

$R_3$Si-L1-Y    (3);

HS-L1-X    (4);

HS-L1-Si$R_3$    (5);

HS-L1-Y    (6);

Z-L2(+)    (7);

L3(−)-Y    (8);

Z-L3(−)    (9);

L2(+)-Y    (10); and

Z—Y    (11);

wherein Z is $R_3$Si or isocyanate (—NCO); R is halogen, $C_1$-$C_4$ alkoxy or $C_1$-$C_4$-alkyl and at least one of three Rs is halogen or alkoxy; L1 is a substituted or non-substituted $C_1$-$C_{17}$ alkyl, aralkyl or aryl and may contain one or more oxygen, nitrogen or sulfur atoms; X is halogen, isocyanate (—NCO), tosyl or azide; R' is halogen, $C_1$-$C_4$ alkoxy or $C_1$-$C_4$ alkyl and at least two of four R's is halogen or alkoxy; M is Silicon, titanium or zirconium; Y is hydroxyl, thiol, amine, ammonium, sulfone or its salt, carboxylic acid or its salt, acid anhydride, epoxy, aldehyde, ester, acryl, isocyanate (—NCO), sugar residue, double bond, triple bond, diene, diyne, alkyl phosphine, alkyl amine and ligand-exchangeable coordinate compounds and may be located at the middle position of the linking compound or at the terminus; L2(+) is a functional group having at least one positive charge in the terminus, straight chain or branched chain of substituted or non-substituted $C_1$-$C_{17}$ hydrocarbon compounds which may contain at least one oxygen, nitrogen or sulfur atom; and L3(−) is a functional group having at least one negative charge in the terminus, straight chain or branched chain of substituted or non-substituted $C_1$-$C_{17}$ hydrocarbon compounds which may contain at least one oxygen, nitrogen or sulfur atom.

5. The method according to claim 4, wherein the substrate is linked to the linking compound represented by the formula 7 and the molecular sieve is linked to the linking compound represented by the formula 8.

6. The method according to claim 4, wherein the substrate is linked to the linking compound represented by the formula 8 and the molecular sieve is linked to the linking compound represented by the formula 7.

7. The method according to claim 1, wherein the application of the physical pressure to molecular sieve crystals against the substrate is carried out by pressing molecular sieve crystals against the substrate.

8. The method according to claim 1, wherein the molecular sieve crystal has a size of 0.1-50 μm.

9. The method according to claim 8, wherein the molecular sieve crystal has a size of 0.4-15 μm.

10. The method according to claim 1, wherein the chemical bond is an ionic bond or hydrogen bond.

11. The method according to claim 1, wherein the molecular sieve crystals attached to the substrate are aligned with b-axis perpendicular to the plane of the substrate.

12. The method according to claim 1, wherein the molecular sieve crystals attached to the substrate are freed from parasitic crystals.

* * * * *